United States Patent [19]

Rogers

[11] Patent Number: 4,937,181
[45] Date of Patent: Jun. 26, 1990

[54] EDUCATIONAL DISPLAY SYSTEM

[76] Inventor: John Rogers, 2500 Lighthouse La., Corona del Mar, Calif. 92101

[21] Appl. No.: 420,933

[22] Filed: Oct. 13, 1989

[51] Int. Cl.$^5$ ............... G09B 25/06; G09B 19/00
[52] U.S. Cl. ............... 434/150; 434/130; 434/151; 434/152; 434/406; 273/157 R; 273/DIG. 30; 446/901
[58] Field of Search ............ 434/130, 150, 151, 152, 434/284, 406, 428, 430; 273/157 R, 260, DIG. 30; 446/901, 85, 108, 111; 40/904, 600

[56] References Cited

U.S. PATENT DOCUMENTS

| | | | |
|---|---|---|---|
| Re. 19,238 | 7/1931 | Burke | 446/901 X |
| 2,338,426 | 6/1942 | Gloeckler | 35/27 |
| 2,369,804 | 11/1943 | Schoolfield | 35/35 |
| 2,554,408 | 8/1946 | Hile | 40/142 |
| 2,717,437 | 10/1952 | De Mestral | 28/72 |
| 3,077,041 | 2/1961 | Larson | 35/73 |
| 3,414,987 | 4/1967 | Lindenauer | 35/60 |
| 3,468,039 | 9/1967 | Dubbert | 35/60 |
| 3,711,966 | 1/1973 | Dresak | 434/150 X |
| 3,748,701 | 7/1973 | De Mestral | 24/204 |
| 3,849,913 | 11/1974 | Williams, Sr. | 434/150 |
| 4,133,123 | 1/1979 | Anderson | 40/1 |
| 4,194,305 | 3/1980 | Smith et al. | 434/150 |
| 4,216,257 | 8/1980 | Schams et al. | 428/93 |
| 4,479,651 | 10/1984 | LaFleur | 273/DIG. 30 |
| 4,552,357 | 11/1985 | Di Egidio | 273/DIG. 30 X |
| 4,632,389 | 12/1986 | Moss | 446/85 |
| 4,671,514 | 6/1987 | Wilson-Diehl | 434/84 X |
| 4,699,385 | 10/1987 | Bifulco | 273/260 |
| 4,770,917 | 9/1988 | Tochacek et al. | 428/95 |
| 4,780,349 | 10/1988 | Gieske et al. | 428/100 |

*Primary Examiner*—Richard J. Apley
*Assistant Examiner*—J. L. Doyle
*Attorney, Agent, or Firm*—Lyon & Lyon

[57] ABSTRACT

An educational visual display system for teaching geography in which objects having some geographical or topographical significance, e.g., states of the Union, may be detachably affixed and arranged to demonstrate relationship between the objects. The preferred system includes (1) a primary background surface of iron velvet fabric material to which hook type fasteners may be detachably adhered, (2) a plurality of primary objects having geographical significance and comprising a soft foam core with a layer of iron velvet fabric on one side and a plurality of hook type fasteners on the other side, the primary objects being arrangeable to represent in combination a larger geographical unit, and (3) a plurality of secondary objects each having geographical or topographical significance and having hook type fasteners on one side thereof for being detachably affixable to the layer of iron velvet fabric of the primary objects. The iron velvet fabric and the hook type fasteners function as an attachment pair similar to hook and loop fasteners sold under the tradename VELCRO ®.

11 Claims, 2 Drawing Sheets

U.S. Patent    Jun. 26, 1990    Sheet 1 of 2    4,937,181
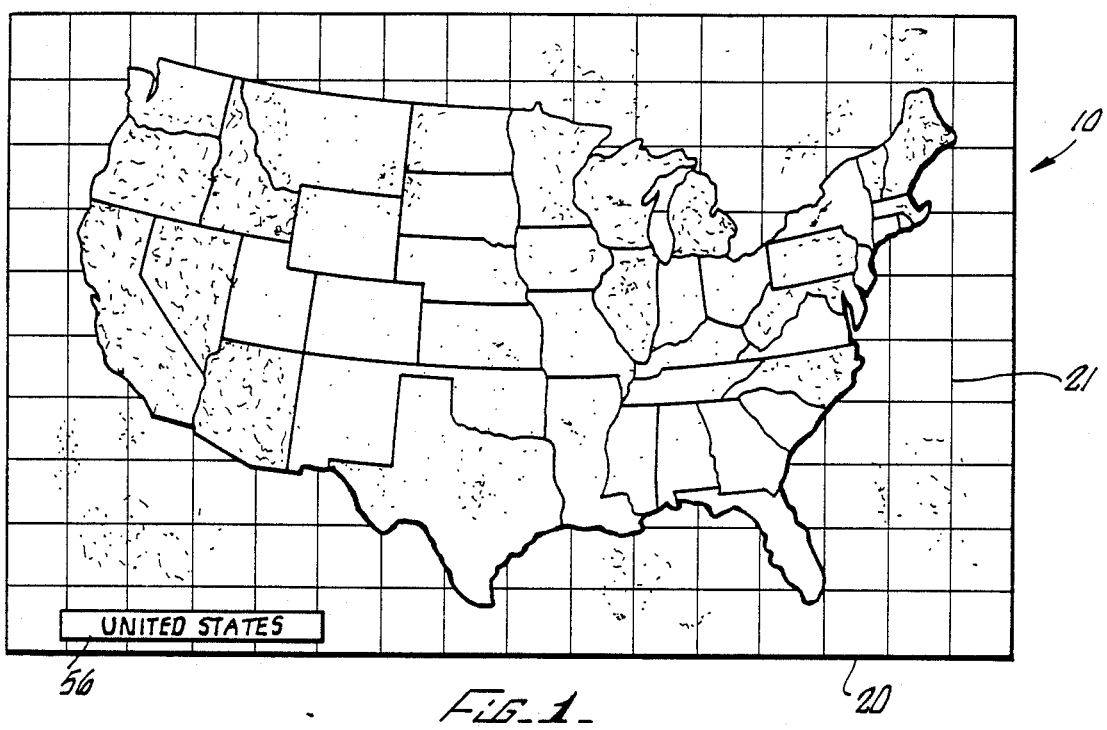
FIG_1_
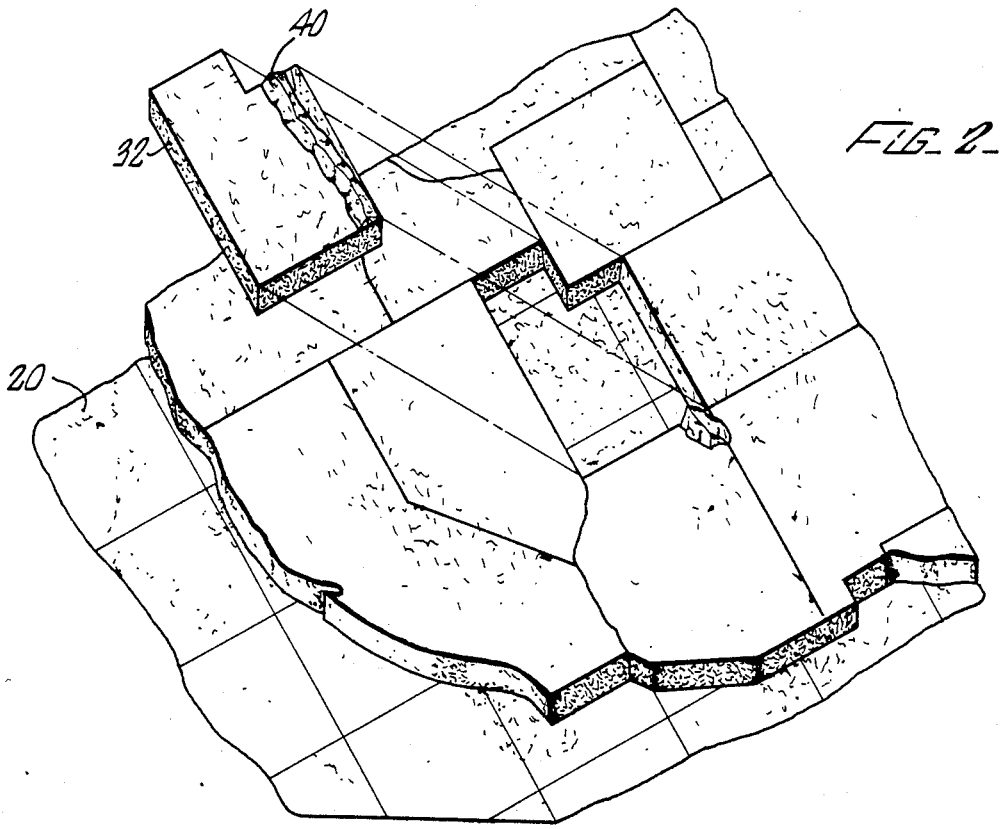
FIG_2_

EDUCATIONAL DISPLAY SYSTEM

BACKGROUND OF THE INVENTION

The field of the present invention relates to a visual display system and more particularly to such a system for use in teaching geography in which objects having geographic or topographical significance easily can be arranged on a suitable background so that their individual size and shape, and their relationship to each other, can be demonstrated in a manner that promotes memory of them.

The study of geography requires a large amount of information to be conveyed to and absorbed by the students. Current surveys indicate that the average student in the United States does not have a strong grasp on the geography of even the locality in which he resides, let alone the country as a whole or the world. One reason is that the typical teaching tools bombard students with information. The most common display devices used for teaching geography are maps, globes or drawings of individual geographic regions such as states in the Union. While maps and the like convey accurate information, they present it in such a mass format that it is difficult for students to absorb, particularly with respect to the relationship of different geographic areas and the location of cities, rivers or topographical features within those areas. Moreover, maps and the like are not interactive with the students and require considerable concentration and memory power rather than an easy association of places and things with easily identifiable physical objects.

SUMMARY OF THE INVENTION

The present invention relates to a visual display system for teaching geography in which three dimensional objects formed to be representative of geographical regions, such as individual states and the like, may be detachably affixed to a suitable background and arranged to demonstrate the relationship between the objects. A second set of objects representing geographical features such as the name of states or cities, or topographical features such as mountains, lakes or rivers, are also provided, this second set of objects being detachably affixed to the first objects so that a three dimensional display of a geographical area complete with place names and topography can be assembled and displayed. The display system of the present invention, having multiple layers with their interrelated configurations, displays a large amount of information in a way that can be readily assimilated by a student. The student can grasp, for example, the interrelation between the states, and the way in which they fit together to form the United States, while simultaneously viewing the location of other important geographical and topographical features.

A preferred embodiment includes a background surface of iron velvet fabric material to which hook type fasteners may be detachably adhered, a plurality of primary objects with a soft foam core having a layer of iron velvet fabric on one side and a plurality of hook type fasteners on the other side for adhering to the background surface to allow the primary objects to be arrange on the background surface, and at least one secondary object having hook type fasteners on one side thereof for being detachably affixable to the layer of iron velvet fabric of the primary object.

In a preferred application, a background surface of iron velvet fabric is hung on a wall and plurality of primary objects formed in the shape of geographical regions such as states are arranged on the background surface to form a larger geographic area such as a country. Each primary object is constructed from soft foam having hook type fasteners on one side and a layer of iron velvet fabric on the other side. Finally, secondary objects such as placards showing region or city names, cutouts of bodies of water, and three dimensional objects such as a mountain ranges may be positioned on the layer of iron velvet surface on the various sections, each of the objects having hook type fasteners on one side thereof.

BRIEF DESCRIPTION OF THE DRAWINGS

FIG. 1 is a front plan view illustrating a map of the United States according to the present invention;

FIG. 2 is a detailed perspective view of a portion of the map of FIG. 1 with the State of Utah removed;

DETAILED DESCRIPTION OF THE PREFERRED EMBODIMENT

Figure 3:
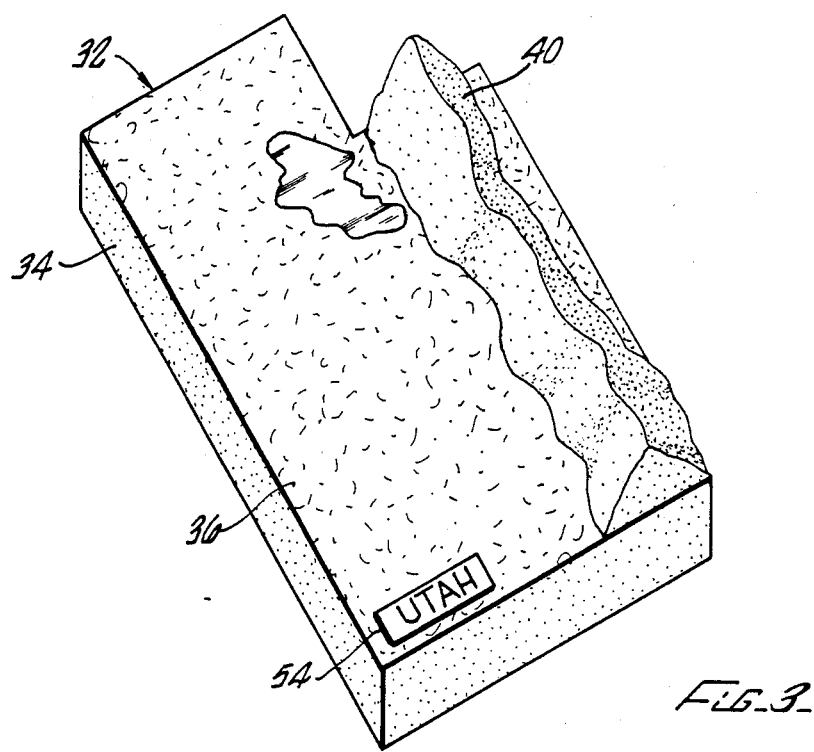
FIG. 3 is an enlarged perspective view of the State of Utah illustrating construction details.

The present invention will now be described with respect to the drawings. For ease of description, a numeral defining an element in one figure will represent the same element in any other figure.

FIG. 1 is a front plan view of a visual display system 10 comprised of a primary surface or background 20 of iron velvet fabric which the instructor may hang on a wall in order to implement the system. For typical classroom use, the background surface 20 has a rectangular shape with dimensions of approximately 7 ft by 5 ft (2.1 m by 1.5 m). The background surface 20 has a grid pattern 21 imposed thereon which provides a spatial pattern to format respective relationships for objects to be placed thereon.

Placed on the background surface 20 are a plurality of primary objects 30 with each primary object 30 representing a particular geographical region namely a state of the Union. The primary objects 30 are then arranged geographically to represent a larger geographical unit, namely the United States.

Figure 4:
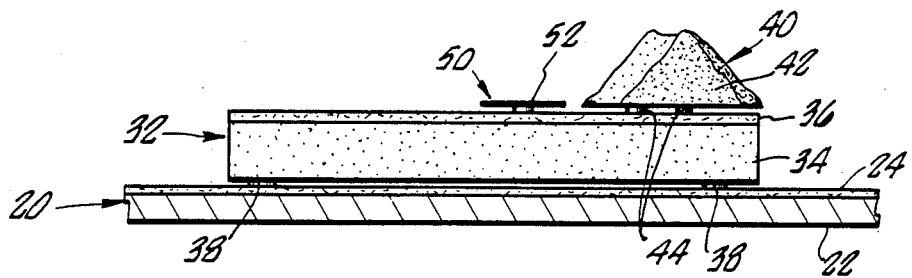
FIG. 4 is a cross-sectional view illustrating the State of Utah in assembled condition.

FIGS. 2-4 illustrate construction details of the display system 10. FIG. 2 is a perspective view of the Southwest portion of the United States with the State of Utah 32 displaced to illustrate internal details. Secondary objects, such as mountain range 40, having for example geographical or topographical significance, may then be affixed to the front surface of the primary objects 30.

The primary object 32 representing the State of Utah is comprised of a foam core piece 34 having a layer of iron velvet fabric 36 on one side thereof and a plurality of hook type fastener pieces 38 on the other side thereof. The soft foam section 34 is approximately one inch thick and is cut in a desired shape to represent the shape of the State of Utah. The background surface 20 is comprised of a stiff support surface 22 having a layer of iron velvet fabric 24 mounted thereon to which the hook type fasteners 38 on the bottom of the primary objects 30 may be detachably adhered. Optionally the background surface 20 may be merely hung up on a wall without the support surface 22.

Finally a plurality of secondary, representational objects such as mountains 40, bodies of water 50, or a written placard 52 may be added. The mountain 40 or some other three dimensional object may be constructed from a soft foam piece 42 to illustrate contour and/or other three dimensional characteristics. A plurality of hook type fasteners 44 are attached to the bottom of the foam piece 42 to permit the mountain 40 to be detachably affixed to the layer of iron velvet fabric 36. Alternately other flat, two dimensional physical representations such as the lake 50 having a surface 52 with one side, for example, having the color blue to represent water, and the other side having a plurality of hook type fasteners attached thereto. The lake 50 may then be detachably affixed to the iron velvet fabric 36. Other items may also be affixed to either section 32 (such as placard 54 in FIG. 3) or the primary surface 20 (such as placard 56 in FIG. 1), the items having the same construction as the lake object 50, the item having, for example, the region's name printed thereon.

The preferred interconnecting means between the various components is a two component hook and loop fastener system sold under the tradename VELCRO ®. Alternately, since it is a two component fastening system, the positions of the individual hook and loop components may be reversed for example having the main background surface 24 comprised of hook type fastener material. The preferred background material is iron velvet fabric which simulates and has the same qualities as loop type fastener which detachable adheres to the hook type fastener material. It is preferred to have the large connecting surfaces, namely the background surface 24 and the layer 36, comprised of iron velvet material as it is less attractive to debris or the like.

Iron velvet fabric is available in a variety of colors. It is a nylon fabric with a polyester foam core. It is available from fabric suppliers including Morgan Fabrics in Los Angeles, Calif. under the tradename TEMPO.

The described display system 10 includes multiple layers with each layer having sections or objects which are representational in nature and which can be easily manipulatable by either a teacher or a student. The preferred embodiment illustrates how readily a layer of primary objects representing states may be applied to a background surface (i.e., the first layer) with a third layer of secondary objects such as lakes, placards, or three dimensional mountains may be applied to the primary objects. Other objects may of course to applied to the background surface to provide further visual representation.

Thus a visual display system which is particularly useful as an educational aid has been shown and described. Though certain examples and advantages have been described, further advantages and modifications may become obvious to one skilled in the art from the disclosures herein. The invention therefore is not to be limited except in the spirit of the claims that follow.

I claim:

1. An educational, manipulatable display system for use in teaching geography, comprising:
    a background surface comprising a material which forms one component of a first two component hook and loop fastener system;
    a plurality of primary objects having different but interrelatable configurations having geographical significance, each of said primary objects being constructed of a soft foam core and having a first surface comprising a material which forms one component of a second hook and loop fastener system and a second surface comprising material which forms the other component of said first two component hook and loop fastener system whereby said primary objects can be adhered to said background surface to form an arrangement having geographical significance; and
    at least one secondary object having topographical or geographical significance, said secondary object having a surface including the other component of said second two component hook and loop fastener system whereby said secondary object is detachably affixable to said first surface of at least one of said primary objects so that said arrangement can be provided with additional topographical or geographical features.

2. The display system of claim 1 wherein there are provided a plurality of said secondary objects, at least one of which represents a topographical feature such as a mountain or a river.

3. The display system of claim 1 wherein said primary objects represent geographical regions that can be arranged on said background surface to form a larger geographical region.

4. The display system of claim 3 wherein said primary objects represent states of the Union and said larger geographic region represents the United States.

5. The display system of claim 1 wherein said core of each of said primary objects is thick enough to provide it with a noticeable three dimensional shape.

6. The display system of claim 1 wherein said detachably affixable material comprises iron velvet fabric.

7. A teaching aid for displaying geographical and topographical features, comprising:
    a background surface of loop containing fabric mountable to a support surface;
    a plurality of primary objects of soft foam having a layer of loop containing fabric on one side and a plurality of hook type fasteners on the other side for being detachably adherable to the background surface of loop containing fabric, each primary object representing a secondary geographical unit, the primary objects being arrangeable on the background surface to represent in combination a primary geographical unit; and
    a plurality of secondary objects having hook type fasteners on one side thereof, each secondary object being detachably affixable to said layer of loop containing fabric on said one side of the primary object.

8. A system according to claim 7 wherein the primary objects represent regions which are arrangeable to represent a country.

9. A system according to claim 7 wherein the secondary objects are constructed from soft foam having three dimensional shape to represent topographical or geographical features.

10. A system according to claim 9 wherein the secondary objects comprise representations selected from the group consisting of: three dimensional shapes representing mountains, placards with writing thereon, placards in the shape of bodies of water.

11. An educational, manipulatable display system for use in teaching geography, comprising:
    a background surface comprising a iron velvet material;
    a plurality of primary objects having different but interrelatable configurations having geographical significance, each of said primary objects being constructed of a soft foam core with a layer of iron velvet on one side and hook fasteners on the other side whereby said primary objects can be adhered to said background surface to form an arrangement having geographical significance; and at least one secondary object having topographical or geographical significance, said secondary object having hook fasteners on one side thereof whereby said secondary object is detachably affixable to said iron velvet layer of at least one of said primary objects so that said arrangement can be provided with additional topographical or geographical features.

* * * * *